United States Patent [19]

McMahan

[11] 4,430,739
[45] Feb. 7, 1984

[54] LASER SYSTEM WITH STANDBY MODE

[76] Inventor: William H. McMahan, 1467 Penrose Dr., Salt Lake City, Utah 84103

[21] Appl. No.: 304,232

[22] Filed: Sep. 21, 1981

[51] Int. Cl.³ .............................................. H01S 3/00
[52] U.S. Cl. .......................................... 372/38; 372/55
[58] Field of Search ...................... 372/38, 87, 81, 55, 372/86, 33

[56] References Cited

U.S. PATENT DOCUMENTS

| | | | |
|---|---|---|---|
| 3,424,946 | 1/1969 | Zulinski | 372/38 |
| 3,453,490 | 7/1969 | Hallock | 372/38 |
| 3,577,174 | 5/1971 | Longderff | 372/38 |
| 3,795,874 | 3/1974 | Pan et al. | 372/38 |

Primary Examiner—William L. Sikes
Assistant Examiner—Léon Scott, Jr.
Attorney, Agent, or Firm—H. Ross Workman; Rick D. Nydegger

[57] ABSTRACT

A laser system having an intermediate mode of laser beam operation wherein the laser beam is extinguished but the laser cathode continues to remain energized. The laser system includes an electronic circuit in which energy is stored while the laser beam is extinguished so that the laser beam can be substantially instantaneously re-ignited when the stored energy is released to the laser anode.

15 Claims, 2 Drawing Figures

LASER SYSTEM WITH STANDBY MODE

BACKGROUND

1. Field of the Invention

The present invention relates to lasers and, more particularly, to a laser system and a method for permitting the laser to be switched on and off substantially instantaneously.

2. The Prior Art

In many industrial and commercial applications of lasers, particularly Argon ion type lasers, it is required that the laser beam be available on a selective basis at different times during system operation. This requirement has been accommodated in the prior art by leaving the laser beam on all the time (i.e., whenever the system is operating) and selectively utilizing the beam by means of optical gating. This has the disadvantage of requiring frequent replacement of the laser. More specifically, an Argon ion type laser typically has a limited plasma current lifetime. Thus, for systems which operate continuously, the laser plasma current lifetime limits the system operational life expectancy.

It would be more desirable and efficient to merely switch the laser beam on and off as dictated by system demands, while leaving the laser filament on. However, while a laser will readily extinguish the instant laser beam current is interrupted, ignition is not so simple. Once the laser beam current is interrupted there is a considerable delay required to re-ignite the laser beam. For example, Argon ion type laser ignition requires storage of a considerable amount of electrical energy and accumulation of sufficient ignition energy results in an undesirable delay which cannot be tolerated for many applications.

BRIEF SUMMARY AND OBJECTS OF THE INVENTION

It is therefore an object of the present invention to provide a method and apparatus which permits a laser beam to be turned on or off substantially instantaneously.

It is another object of the present invention to provide a laser system having an intermediate standby mode of laser beam operation between the fully off and fully on modes, wherein the laser beam is extinguished while maintaining the laser cathode energized and while storing sufficient ignition energy to permit the laser beam to be re-ignited substantially instantaneously.

It is still another object of the present invention to provide a control circuit that can be remotely accessed and controlled by a system user, and which maintains the laser in a standby mode, ready for immediate beam ignition, after the beam is extinguished.

In accordance with the foregoing objects the laser system of the present invention is placed in a zero plasma current standby mode using a standby control circuit. As used herein, the term "standby mode" refers to an intermediate mode of laser beam operation wherein the laser beam is extinguished but the laser cathode continues to remain energized and ignition energy continues to be stored so that the laser beam can be substantially instantaneously re-ignited.

The standby control circuit is used to selectively trigger a pulsed high voltage plasma starting circuit and it also controls a laser power supply and beam current control circuit. The standby control circuit allows the laser system to be placed in the standby mode by momentarily reducing the beam current supplied by the laser power supply and beam current control circuit to zero, which extinguishes the laser beam.

The moment the laser beam current goes to zero, energy that will be required to re-ignite the laser beam begins to be stored in the high voltage plasma starting circuit and in a pulsed current plasma starting circuit. When the high voltage plasma starting circuit and current plasma starting circuit become fully charged the laser system is armed so that the laser beam can be substantially instantaneously re-ignited by using the standby control circuit to trigger the high voltage plasma starting circuit. When triggered, the high voltage plasma starting circuit supplies the laser anode with a high voltage pulse which is followed by a current pulse from the current plasma starting circuit such that the laser beam is re-ignited.

The foregoing objects and features of the present invention will become more fully apparent from the following description and the appended claims taken in conjunction with the accompanying drawings.

DETAILED DESCRIPTION OF THE PREFERRED EMBODIMENTS

Figure 1:
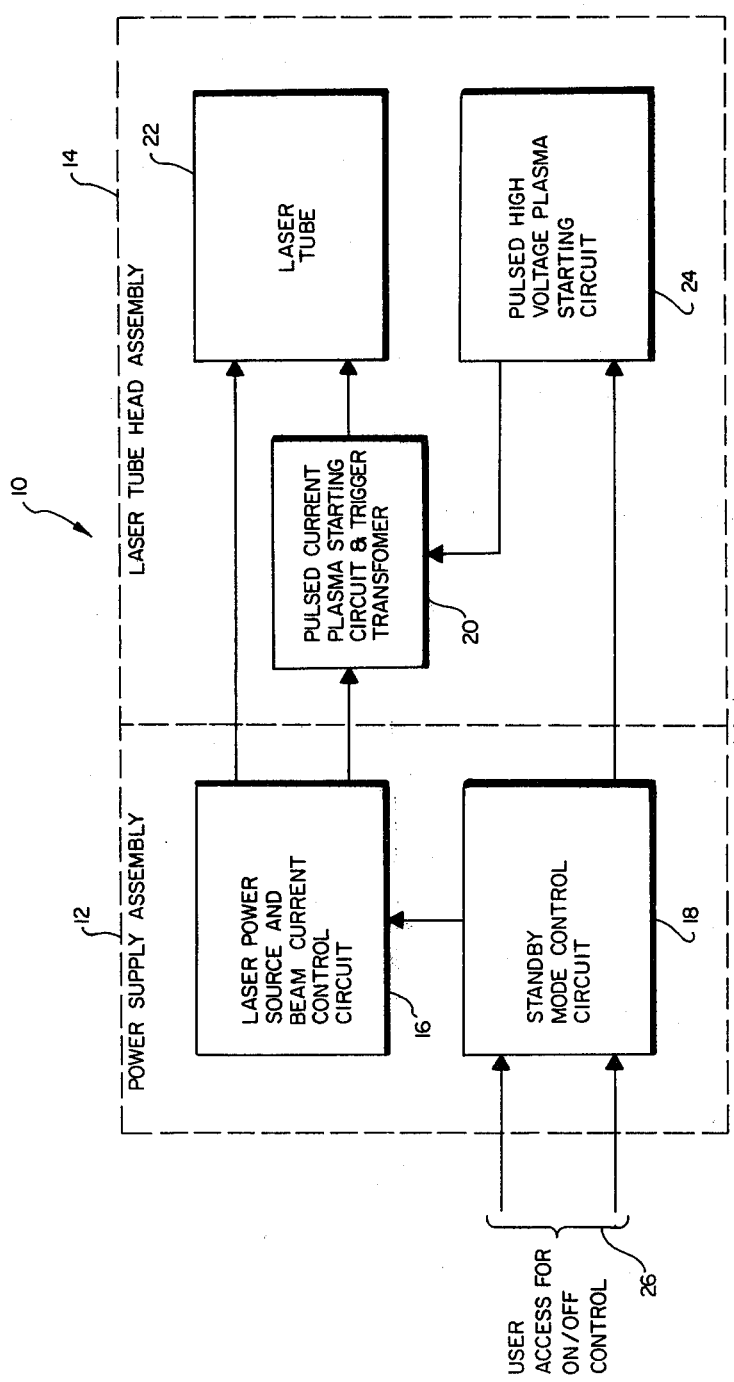
FIG. 1 is a functional block diagram that generally illustrates the laser system and method of the present invention.

Reference is now made to the figures wherein like parts are designated with like numerals throughout. With reference first to FIG. 1, the laser system of the present invention is generally designated at 10. The laser system can be broken down into basically two subassemblies, the power supply assembly 12 and the laser tube head assembly 14 which are schematically illustrated by the broken lines in FIG. 1. The power supply assembly 12 includes the laser power source and beam current control circuit 16 and the standby mode control circuit 18. The laser tube head assembly 14 includes the laser tube 22, pulsed current plasma starting circuit 20 and the pulsed high voltage plasma starting circuit 24.

With continued reference to FIG. 1, the laser power source and beam current control circuit 16 is a conventional laser power supply used to supply energy to the laser tube 22. In accordance with the principles of the present invention, the standby mode control circuit 18 may be operated to momentarily reduce the beam current to zero by interrupting the current supplied by the laser power source 16. Operation of the standby mode control circuit 18 can be remotely controlled by a system user from the remote access terminals 26 provided with the laser system 10 of the present invention.

When the laser beam current is interrupted by the standby mode control circuit 18, the energy required to re-ignite the laser beam begins to be stored in the pulsed high voltage plasma starting circuit 24 and the pulsed current plasma starting circuit 20. As soon as the circuits 24 and 20 become fully charged the laser system is ready to re-ignite the laser beam. As hereinafter more fully described, in the standby mode the ignition energy required to re-ignite the plasma current of laser tube 22 is quickly stored in the circuits 24 and 20 and since the cathode of laser tube 22 and pre-ignition electrodes 32 and 34 (see FIG. 2) remain energized at all times during the standby mode, the laser system is fully armed and the laser beam is ready to be re-ignited upon triggering the high voltage plasma starting circuit 24.

The pulsed high voltage plasma starting circuit 24 is triggered by the standby mode control circuit 18, which in turn is controlled through the remote access terminals provided at 26. The instant the standby mode control circuit 18 triggers the pulsed high voltage plasma starting circuit 24, a high voltage pulse of energy is released from the circuit 24 to the laser tube 22, which is also pulsed by a discharge of current from energy stored in circuit 20. The released energy is sufficient to ionize the lasing medium in tube 20 and to bring the level of plasma current up to the level necessary to sustain lasing action, thus re-igniting the laser beam.

Figure 2:
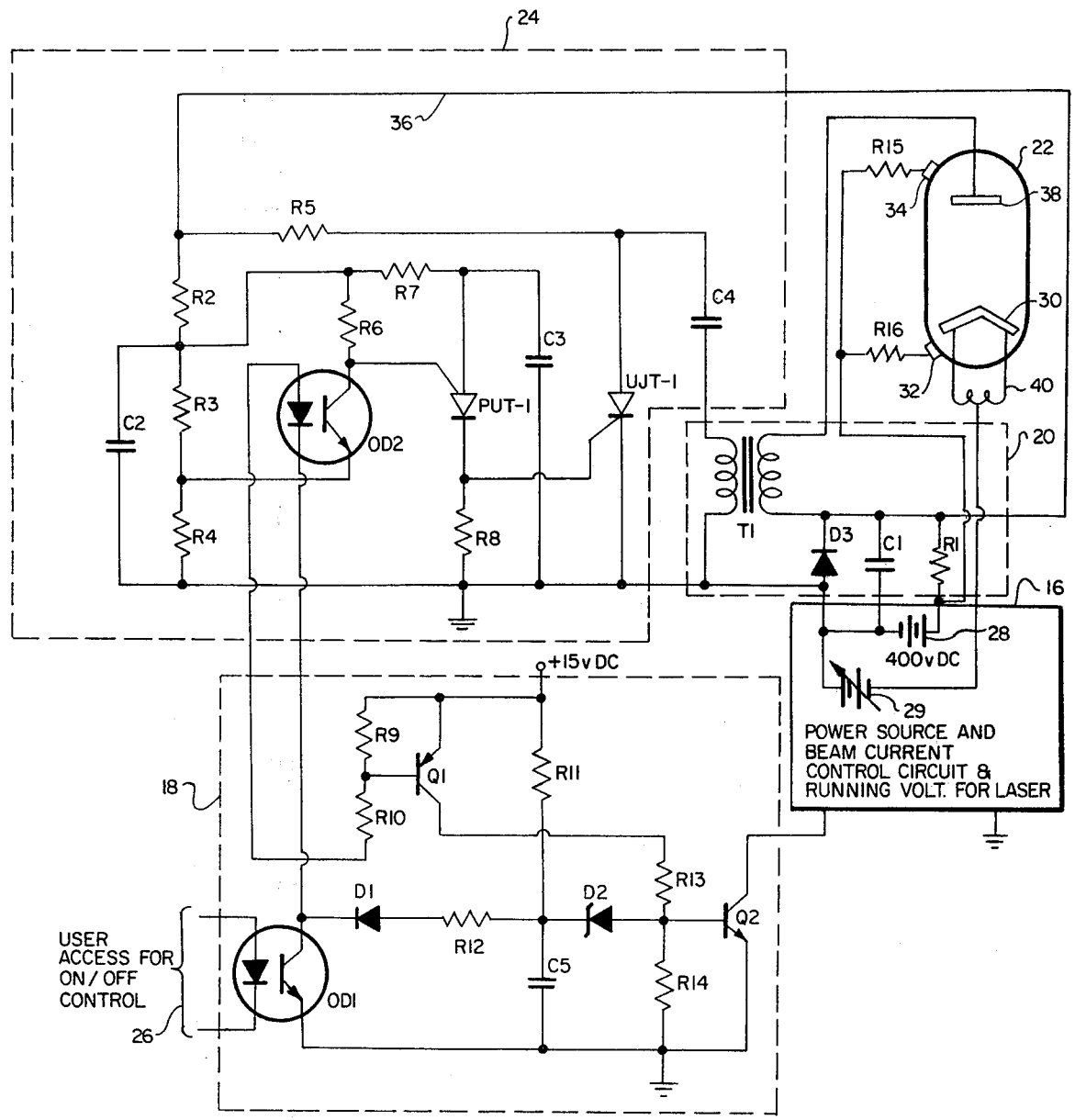
FIG. 2 is a schematic diagram of one presently preferred embodiment of the laser system of the present invention.

Reference is next made to FIG. 2, which illustrates in more detail one presently preferred embodiment of a schematic diagram which embodies the principles of the present invention as illustrated in the functional block diagram of FIG. 1. Those of ordinary skill in the art will of course appreciate that various modifications to the detailed schematic diagram of FIG. 2 may be easily made without departing from the essential characteristics of the invention as described and illustrated in the diagram of FIG. 1. Thus, the detailed schematic diagram of FIG. 2 is intended only as an example of one presently preferred embodiment of the general principles of the invention as illustrated and described above.

With reference to FIG. 2, portions of the schematic diagram which correspond to the block diagram of FIG. 1 have been enclosed by broken lines indicated at 18, 20 and 24. The portion of the schematic diagram enclosed by the broken line box at 18 corresponds to the standby mode control circuit 18 (see also FIG. 1) generally described above. The portion of the schematic diagram enclosed by the broken lines 20 corresponds to the pulsed current plasma starting circuit 20 of FIG. 1, and the portion enclosed by broken lines 24 corresponds to the pulsed high voltage plasma starting circuit 24 of FIG. 1.

Referring to FIG. 2 in greater detail, a laser tube is schematically illustrated at 22. For purposes of the specific embodiment described and illustrated herein, laser tube 22 may be an Argon ion type laser tube for which the present invention is particularly advantageous. However, it should be noted that the inventive concepts described herein are useful and applicable to other types of lasers, gaseous or otherwise, wherein the beam supply voltage is required to charge certain capacitors or like components over a finite time before lasing action can be triggered.

Laser power source 16 is a conventional beam power supply and current control circuit such as commonly used in the art. As schematically shown at 28, power supply 16 provides a 400 volts d.c. source as well as a rectified and controlled d.c. source 29 for providing the laser beam current through winding 40.

Pre-ignition electrodes 32 and 34 are connected through current limiting resistors R15 and R16 to the 400 volts d.c. source, and are used to pre-ionize the Argon gas in tube 22. The pre-ignition electrode 32 establishes a very low, continuous power discharge near the cathode to enhance plasma current start-up and ignition of the laser beam.

The pulsed high voltage plasma starting circuit 24 is a pulsed, series injection trigger start circuit. Circuit 24 is connected through lead 36 to current limiting resistor R1 and the 400 volts d.c. power supply. Three series-connected resistors R2, R3 and R4 serve as a voltage divider chain. A capacitor C2 is connected across resistors R3 and R4. The series-connected combination of resistor R5 and the anode-cathode circuit of unijunction transistor UJT-1 are connected to the junction between resistors R1 and R2.

A further resistor R6 is connected to the collector of NPN phototransistor OD2, the emitter of which is connected to the junction between resistors R2 and R3 and to one end of resistor R7. The latter is connected in series with the anode-cathode circuit of programmable unijunction transistor PUT-1 and resistor R8 which is returned to ground. The collector of phototransistor OD2 is connected to the gate electrode of PUT-1. A capacitor C3 is connected from the anode of PUT-1 to ground.

An energy storage capacitor C4 and the primary winding of trigger transformer T1 are connected in series across the anode-cathode circuit of UJT-1. The secondary winding of transformer T1 is connected to the laser anode 38 in a conventional manner.

The standby mode control circuit 18 is powered by a 15 volts d.c. supply, across which is connected the series combination of resistors R9 and R10, the light emitting diode portion of phototransistor OD2, and the collector-emitter circuit of further NPN phototransistor OD1. The latter also has a light emitting diode to control its conductive state, which didode is remotely accessed at terminals 26 by the system user such that it may be either manually or automatically actuated. For purposes of the present invention, it is assumed that when it is desired to ignite laser tube 22 the system user passes current through the control didode for phototransistor OD1; to extinguish the laser, current through that diode is terminated.

A delay bias circuit comprising series connected resistor R11 and capacitor C5 is connected between the +15 volts d.c. terminal and ground. A discharge path for capacitor C5 is provided through the collector-emitter circuit of phototransistor OD1 by series connected resistor R12 and diode D1.

An alternate direct bias circuit takes the form of PNP transistor Q1 which has its collector-emitter circuit connected in series with resistor R13 and R14. The emitter of transistor Q1 in connected to the +15 volts d.c. source, its base is connected to the junction between resistors R9 and R10, and its collector is connected to resistor R13.

The delay bias circuit and the alternate bias circuit function to bias NPN transistor switch Q2 which has its collector connected to control the laser beam power supply 16, its emitter connected to ground, and its base connected to the junction between resistors R13 and R14. A Zener diode D2, which serves as part of the delay bias circuit, has its anode connected to the base of transistor Q2 and its cathode connected to the junction between capacitor C5 and resistor R11.

The pulsed current plasma starting circuit 20 (see also FIG. 1) consists of diode D3 and capacitor C1 which are connected in parallel between the power source 16 and the secondary transformer winding of T1. When the laser beam is ignited, didode D3 (which is a 35 amp, 600 volt diode) is forward biased, thus effectively short-circuiting the pulsed high voltage plasma starting circuit 24. When the laser beam is extinguished and the laser system is in the standby mode, diode D3 is reverse biased so energy is stored in capacitor C1 as well as in the capacitor C4 and anode of unijunction transistor UJT-1.

When the pulsed high voltage plasma starting circuit 24 is triggered by the phototransistor OD1 of standby mode control circuit 18, a high voltage pulse of energy is triggered and applied to the anode 38 of laser tube 22 through transformer T1. Capacitor C1 then discharges so that a current pulse is applied to the laser anode 38. The high voltage pulse from starting circuit 24 and the current pulse from capacitor C1 provide the necessary energy to re-ignite the laser beam.

In operation, it is initially assumed that no current is applied at the remote access terminals 26 to the control diode for phototransistor OD1, thereby signifying an extinguished condition for the laser beam. Phototransistors OD1 and OD2 are cut-off (i.e., non-conductive) as are PUT-1, UJT-1, and transistor Q1. With the 15 volts d.c. supply voltage applied to the circuit, capacitor C5 charges through resistor R11. When the voltage across capacitor C5 exceeds the breakdown voltage of Zener diode D2, transistor Q2 is biased into saturation (i.e., its conductive state). The charge time required to bias transistor Q1 into conduction is on the order of one second.

If current is now supplied by the system user at remote access terminals 26 to the control diode for phototransistor OD1 (i.e., signifying an ignition mode), the collector-emitter circuit of OD1 is rendered conductive. This has three primary effects. First, current is caused to flow through the control diode of phototransistor OD2 which drives the collector-emitter circuit into conduction. The resulting reduction in voltage level appearing at the gate electrode of PUT-1 causes it to conduct, serving as a discharge path for capacitor C3. The gate electrode of UJT-1 thereby experiences a voltage increase sufficient to drive UJT-1 into conduction whereby it provides a discharge path for capacitor C4. The discharge of capacitor C4 causes current to flow through the primary winding of transformer T1 to apply a high voltage trigger pulse to the laser tube anode 38. Capacitor C1 then discharges a current pulse to pre-ignition electrodes 32 and 34. The laser beam is therefore triggered on. When capacitors C3 and C4 discharge sufficiently, PUT-1 and UJT-1 are cut-off permitting the two capacitors to re-charge and await the next negative-going transition at the collector of phototransistor OD2.

The second effect of rendering phototransistor OD1 conductive is that current flow through resistors R9 and R10 causes transistor Q1 to conduct. This activates the alternative bias circuit by causing current to flow through resistors R13 and R14. The base of transistor Q2 is thereby maintained positively biased to keep transistor Q2 in conduction so that the laser beam power supply 16 remains energized.

The third effect of rendering the phototransistor OD1 conductive is to discharge capacitor C5 through resistor R12, diode D1, and the collector-emitter circuit of phototransistor OD1. This removes the bias effect of the delay bias circuit but, as noted above, transistor Q2 remains conductive due to the current flow through resistors R13 and R14.

When current flow from remote access terminals 26 is removed from the control diode in phototransistor OD1, transistor Q1 is cut-off due to the interruption of current flow through resistors R9 and R10. When transistor Q1 is cut-off, current flow through resistors R13 and R14 terminates, removing the alternate bias from the base of transistor Q2 which is thereby cut-off. With transistor Q2 cut-off, beam current from supply 16 is removed from the laser and the beam is extinguished. With the collector-emitter circuit of phototransistor OD1 not conducting, capacitor C5 begins to charge through resistor R11. When the voltage across capacitor C5 reaches the breakdown voltage of Zener diode D2, the latter is rendered conductive and transistor Q1 is once again biased on to actuate the laser power supply 12. Thus, the beam current from power supply 16 is removed momentarily to extinguish the laser beam and is then restored to permit the next signal from remote access 26 to ignite the laser beam. Typically, the recharge time for capacitor C5 is on the order of one second.

By means of the present invention, as described in relation to the preferred embodiment, a laser beam can be ignited and extinguished substantially instantaneously on command. The beam turn-on time, in response to an ignite pulse from circuit 24, is typically one millisecond. The beam turn-off time, in response to the extinguish command, is typically 0.2 milliseconds.

The circuit components in the drawing may have the component values listed in Table I for the preferred embodiment of the invention. It is to be understood that these values are provided by way of example only and are not to be construed as limiting the scope of the invention.

TABLE I

| Component | Value |
|---|---|
| Resistor R1 | 47 K ohms |
| Resistor R2 | 680 K ohms |
| Resistor R3 | 68 K ohms |
| Resistor R4 | 39 K ohms |
| Resistor R5 | 100 K ohms |
| Resistor R6 | 100 K ohms |
| Resistor R7 | 1.2 M ohms |
| Resistor R8 | 100 K ohms |
| Resistor R9 | 820 ohms |
| Resistor R10 | 1.2 K ohms |
| Resistor R11 | 10 K ohms |
| Resistor R12 | 1 k ohm |
| Resistor R13 | 15 K ohms |
| Resistor R14 | 4.7 K ohms |
| Resistor R15 | 100 K ohms |
| Resistor R16 | 100 K ohms |
| Capacitor C1 | 10 $\mu$f (400 volts) |
| Capacitor C2 | 0.1 $\mu$f (50 volts) |
| Capacitor C3 | 0.1 $\mu$f (50 volts) |
| Capacitor C4 | 1.0 $\mu$f (400 volts) |
| Capacitor C5 | 50 $\mu$f (50 volts) |

The specific circuit illustrated in FIG. 2 and described above is merely one embodiment of the invention and should not be construed as the only embodiment. The invention may be embodied in other specific forms without departing from its spirit or essential characteristics. The described embodiment is to be considered in all respects only as illustrative and not restrictive, and the scope of the invention is, therefore, indicated by the appended claims rather than the foregoing description. All changes which come within the meaning and range of equivalency of the claims are to be embraced within their scope.

What is claimed and desired to be secured by United States Letters Patent is:

1. A laser system comprising:
    a laser tube having an anode and a cathode, said laser tube comprising means requiring application of a high voltage to initiate production of a laser beam in the tube;

a power source connected to said laser tube, said source comprising means for providing both a high startup voltage and a continuous current for running said laser tube; and electronic circuit means for placing the laser of said system in a standby mode such that said laser beam is extinguished but the laser cathode continues to remain energized by said power source, said electronic circuit means comprising means for storing sufficient electrical energy while said beam is extinguished that production of the laser beam can be substantially instantaneously re-initiated by releasing the stored electrical energy to said laser tube.

2. A laser system as defined in claim 1 wherein said energy storage means comprise first means for discharging energy in the form of a pulsed high voltage to the anode of said laser tube and wherein said electronic circuit means further comprise standby control means for selectively triggering said first means to discharge said pulsed high voltage to the laser anode.

3. A laser system as defined in claim 2 wherein said electronic circuit means further comprise means for accessing remote command signals initiated by a system user, said command signals controlling the said standby control means so as to trigger the discharge of said pulsed high voltage.

4. A laser system as defined in claim 2 wherein said energy storage means further comprise second means for discharging energy in the form of a pulsed current to the anode of said laser tube following the high voltage discharge from said first means.

5. A laser system as defined in claim 2 wherein said standby control means comprise means for selectively interrupting the current from said power source in order to extinguish said laser beam.

6. A laser system as defined in claim 1 further comprising a pair of pre-ignition electrodes connected to said laser tube, each said electrode being connected to said power source so that a low, continuous power discharge occurs within the laser tube from at least one of the said electrodes near the laser cathode to enhance ignition of the said laser beam.

7. A laser system as defined in claim 1 wherein said laser tube is an Argon ion type laser tube.

8. A laser system comprising:
a laser tube having an anode and a cathode, said laser tube comprising means requiring application of high voltage to initiate production of a laser beam in the tube;

a power source connected to said laser tube, said power source comprising means for providing both a high startup voltage and a continuous current for running said laser tube; and electronic circuit means for placing the laser of said system in a standby mode such that said laser beam is extinguished but the laser cathode continues to remain energized by said power source, said electronic circuit means being connected to said laser tube and said power source and comprising:

means for storing sufficient electrical energy while said beam is extinguished so that production of the laser beam can be substantially instantaneously re-initiated by releasing the stored electrical energy to said laser tube, said means for storing electrical energy comprising (1) first means for discharging electrical energy in the form of a pulsed high voltage to the anode of said laser tube in response to a remotely initiated command signal, and (2) second means for discharging electrical energy in the form of a pulsed current to the anode of said laser tube following the discharge from said first means;

standby control means for selectively triggering said first means to discharge said pulsed high voltage to the laser anode, and said standby control means also comprising means for selectively interrupting the current from said power source in response to a remotely initiated command signal; and means, connected to said standby control means, for accessing remotely initiated command signals.

9. A laser system as defined in claim 8 further comprising a pair of pre-ignition electrodes connected to said laser tube, each said electrode being connected to said power source so that a low, continuous power discharge occurs from at least one of said electrodes near the laser cathode to enhance ignition of the said laser beam.

10. A laser system as defined in claim 8 wherein said laser tube is an Argon ion type laser tube.

11. A laser system as defined in claim 8 wherein said first means for discharging energy in the form of a pulsed high voltage to the anode of said laser tube comprises:

a unijunction transistor for providing a discharge path which causes stored electrical energy to be released to the anode of the laser tube;

a first capacitor connected across the anode and cathode of said unijunction transistor;

a programmable unijunction transistor connected at its cathode to the gate of said unijunction transistor;

a second capacitor connected across the anode and cathode of said programmable unijunction transistor; and a phototransistor connected at its collector terminal to the gate electrode of said programmable unijunction transistor.

12. A laser system as defined in claim 11 wherein said second means for discharging energy comprises:

a triggering transformer having a primary and a secondary winding, the primary winding being connected in series with said first capacitor across the anode and cathode of said unijunction transistor, and the secondary winding of said transformer being connected to the anode of said laser tube;

a first diode connected at its cathode to the secondary winding of said transformer, and connected at its cathode to said power source for enabling discharge of electrical energy by said first and second means for discharging energy; and a third capacitor connected across the anode and cathode of said first diode for storing electrical energy in an amount sufficient to produce a high voltage pulse of energy.

13. A laser system as defined in claim 12 wherein the said means for interrupting the power source current comprises a first transistor connected at its collector to said power source, said first transistor serving as an electronic switch which may be activated to momentarily interrupt the current provided by said power source to said laser tube.

14. A laser system as defined in claim 13 wherein said standby control means for selectively triggering the discharge of said pulsed high voltage to the laser anode comprise:
- a said second phototransistor, a light emitting diode portion of said second phototransistor being connected to a pair of remote access terminals for receiving remote command signals from the system user, the collector terminal of said second phototransistor being connected to the cathode of the light emitting diode of said first phototransistor;
- a second transistor connected at its gate to the anode terminal of the light emitting diode of said first phototransistor, the emitter of said second transistor being connected to the gate of said first transistor.

15. A method for placing a laser system in a standby mode such that the laser beam can be extinguished and then production of the laser beam can be substantially instantaneously re-initiated, the laser system comprising (1) a laser tube having an anode and a cathode, the laser tube comprising means requiring application of high voltage to initiate production of the laser beam in the tube, and (2) a power source connected to said laser tube, the power source comprising means for providing both a high startup voltage and a continuous current for running the laser tube, and the method comprising the steps of:
- extinguishing the laser beam by momentarily interrupting the current provided from said power source to said laser tube;
- storing electrical energy in an electronic circuit at the same time as said beam is extinguished and while the laser cathode continues to be energized by said power source; and
- thereafter releasing the stored electrical energy in the form of a high voltage discharge applied to the anode of said laser tube so that production of the laser beam is substantially instantaneously re-initiated.

* * * * *